United States Patent
Dean et al.

(10) Patent No.: US 7,220,792 B2
(45) Date of Patent: May 22, 2007

(54) WATER RESISTANT PERMANENT ANTISTATIC THERMOPLASTIC COMPOSITION

(75) Inventors: Jennifer Dean, Eindhoven (NL); Dibaker Dhara, Bangalore (IN); Johannes Martinus Dina Goossens, Bergen op Zoom (NL); Theodorus Lambertus Hoeks, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 494 days.

(21) Appl. No.: 10/748,372

(22) Filed: Dec. 30, 2003

(65) Prior Publication Data

US 2005/0148710 A1   Jul. 7, 2005

(51) Int. Cl.
   *C08K 5/42*   (2006.01)
(52) U.S. Cl. .................. 524/157; 524/158; 524/159; 524/165
(58) Field of Classification Search .............. 524/157, 524/158, 159, 165
   See application file for complete search history.

(56) References Cited

U.S. PATENT DOCUMENTS

| | | | |
|---|---|---|---|
| 3,169,121 A | 2/1965 | Goldberg | 260/47 |
| 3,635,895 A | 1/1972 | Kramer | 260/47 XA |
| 4,001,184 A | 1/1977 | Scott | 260/47 XA |
| 4,450,249 A | 5/1984 | Schmidt et al. | |
| 4,487,896 A | 12/1984 | Mark et al. | 525/439 |
| 4,690,688 A | 9/1987 | Adams et al. | 44/76 |
| 4,914,150 A | 4/1990 | Prier | 524/701 |
| 4,943,380 A | 7/1990 | Sugiura et al. | 252/8.7 |
| 5,071,884 A | 12/1991 | Malone | |
| 5,187,214 A | 2/1993 | Govindan | |
| 5,322,882 A | 6/1994 | Okamoto | 524/265 |
| 5,376,715 A | 12/1994 | Fennhoff et al. | 524/265 |
| 5,620,485 A | 4/1997 | Fey | 44/320 |
| 5,852,098 A | 12/1998 | Kohler et al. | 524/494 |
| 6,040,053 A | 3/2000 | Scholz et al. | |
| 6,056,900 A | 5/2000 | Shimizu et al. | 264/2.6 |
| 6,090,907 A | 7/2000 | Saito et al. | 528/198 |
| 6,133,370 A | 10/2000 | Gutek et al. | 524/588 |
| 6,187,888 B1 | 2/2001 | Shimizu et al. | 526/314 |
| 6,194,497 B1 | 2/2001 | Willems et al. | 524/165 |
| 6,225,391 B1 | 5/2001 | Parthasarathy et al. | |
| 6,740,413 B2 | 5/2004 | Klun et al. | |
| 2003/0065071 A1 | 4/2003 | Scholten | 524/136 |
| 2003/0109660 A1 | 6/2003 | Oda et al. | |

FOREIGN PATENT DOCUMENTS

| | | |
|---|---|---|
| DE | 28 54 136 A1 | 12/1979 |
| EP | 0 897 950 | 7/1998 |
| EP | 0 897 950 | 2/1999 |
| EP | 1000969 | 5/1999 |
| WO | WO 01/25326 | 12/2001 |
| WO | WO 01/49925 | 12/2001 |

OTHER PUBLICATIONS

International Search Report for PCT/US2004/042873. Mailed Mar. 31, 2005.
International Search Report for PCT/US2004/042715. Mailed Apr. 14, 2005.
Bajaj, et al. "Antistatic and Hydrophilic Synthetic Fibers: A Critique". J.M.S.-REV. Macromol. Chem. Phys., C40,(2&3), 105-138 (2000).
JP2003176405. Publication Date Jun. 24, 2003. "Antistatic Polycarbonate Resin Composition". Machine Translation and Abstract.
International Search Report for International application No. PCT/US2004/040641. Mailed on May. 24, 2005.
Yuan, et al., "Surface Enrichment of Poly(trifluorovinyl ether)s in Polystyrene Blends", Macromolecules 2000, 33, pp. 4926-4931.
Guo, et al., "Surface characterization of blood compatible amphiphilic graft copolymers having uniform poly(ethylene oxide) side chains", Polymer 42 (2001), pp. 1017-1022.
Torstensson, et al., "Monomeric Surfactants for Surface Modification of Polymers", Macromolecules 1990, 23, pp. 126-132.
Walton, et al., "Creation of Stable Poly(ethylene oxide) Surfaces on Poly(methyl methacrylate) Using Blends of Branched and Linear Polymers", Macromolecules 1997, 30, pp. 6947-6956.
Anastasiadis, et al., "Smart Polymer Surfaces", Macromolecules 2003, 36, pp. 1994-1999.
Abstract JP9279010, "Polycarbonate Resin Composition and Molded Product Thereof", Publication Date 19971028.

*Primary Examiner*—Edward J. Cain

(57) ABSTRACT

A water resistant permanent antistatic thermoplastic composition contains about 100 parts by weight of a thermoplastic polymer, such as polycarbonate or a blend thereof, about 0.1 to about 10 parts by weight of an antistatic agent, and about 0.1 to about 10 parts by weight of a polysiloxane-polyether copolymer.

14 Claims, No Drawings

WATER RESISTANT PERMANENT ANTISTATIC THERMOPLASTIC COMPOSITION

BACKGROUND OF THE INVENTION

The present invention relates to a water resistant thermoplastic composition, comprising a thermoplastic polymer, an antistatic agent, and a polysiloxane-polyether copolymer to render the composition permanently antistatic.

Polycarbonate based compositions (hereinafter polycarbonate will also be referred to as "PC") are known for their excellent properties in terms of transparency, heat resistance and mechanical strength. Therefore, they are used in a broad variety of applications, for example lighting applications, such as automotive head lamp lenses, covers and lenses for various illuminating devices, transparent films and sheets, optical disks and optical disk cartridges, various parts used in office equipment and household appliances, and case materials used for storage and transportation, etc.

In particular, in applications where optical properties or aesthetic appearance of plastic parts are significant, the electrostatic nature of PC surfaces in general can cause problems. Accumulation of electrical charges on the polymeric parts causes dust and dirt from the environment to be attracted to the polymeric surfaces. Because PC is an electrical insulator material, irregular surface charge distributions on the surface occur. As a result visually disturbing dust or dirt attraction patterns e.g. fernlike marks arise, especially after prolonged exposure or after electrostatic charging in the final application.

In order to overcome the above problems essentially two ways have been suggested. The first one consists of applying external antistatic additives, for instance by spraying an antistatic coating formulation onto a final part or by dipping the part into the coating. The second method consists of adding an internal antistatic additive directly to the thermoplastic polymer composition. The antistatic additive needs to have a presence at the surface of the final part.

Antistatic additives used in such compositions enable dissipation of electrical surface charges. Most commonly they attract water to the polymeric surface, thereby forming a conductive surface layer. For optical quality PC applications, esters of branched fatty acids and polyhydroxylic compounds and phosphonium sulfonates have been suggested as antistatic additives. Especially the alkylphenylsulfonate phosphonium salts have been appreciated for their antistatic effectiveness.

A drawback of the alkylphenylsulfonate phosphonium salts as antistatic agents is that the required concentration levels for satisfactory antistatic behavior and persistence are high. In practice, they are higher than one would like, thereby other desirable properties are adversely affected. Substituted alkylsulfonate phosphonium salts as disclosed in U.S. Pat. No. 6,194,497 to Willems, particularly perfluoronated alkylsulfonate phosphonium salts, are effective antistatic agents at lower loadings. United States application 2003-65071A to Scholten discloses compositions comprising an antistatic agent and small amounts (0.01–1 parts) of a silicon oil, wherein the silicon oil acts as an antistatic activity enhancer. The enhancing function of the silicon oil is that it improves the permanency of the antistatic characteristic upon heat aging. Nothing is indicated however about the resistance and the permanency of the antistatic character upon exposure to water.

There remains a need in the art for water resistant permanent antistatic compositions, particularly upon exposure to water.

SUMMARY OF THE INVENTION

In general, the present invention applies to high performance engineering plastics to which anti-static agents, especially sulphonic acid salts, can be added in combination with polymeric polysiloxane-polyether copolymer to render the composition water resistant and anti-static.

In one embodiment, a thermoplastic composition comprises about 100 parts by weight of a polycarbonate, an aromatic polycarbonate, a (co)polyestercarbonate, an aromatic (co)polyestercarbonate, blends thereof, or a combination comprising at least one of the foregoing polymers; about 0.1 to about 10 parts by weight of an antistatic agent; and about 0.1 to about 10 parts by weight of a polysiloxane-polyether copolymer.

In another embodiment, a method for making a permanently antistatic article comprises melt mixing about 100 parts by weight of a polycarbonate, an aromatic polycarbonate, a (co)polyestercarbonate, an aromatic (co)polyestercarbonate, blends thereof, or a combination comprising at least one of the foregoing polymers, about 0.1 to about 10 parts by weight of an antistatic agent, and about 0.1 to about 10 parts by weight of a polysiloxane-polyether copolymer to form a blend; and molding the blend to form an article.

In yet another embodiment, a sheet or film of a thermoplastic resin composition comprises about 100 parts by weight of a polycarbonate, an aromatic polycarbonate, a (co)polyestercarbonate, an aromatic (co)polyestercarbonate, blends thereof, or a combination comprising at least one of the foregoing polymers; about 0.1 to about 10 parts by weight of an sulfonic acid salt antistatic agent; and about 0.1 to about 10 parts by weight of a polysiloxane-polyether copolymer.

DETAILED DESCRIPTION OF THE INVENTION

It is the object of the present invention to provide thermoplastic resin compositions with excellent permanent antistatic properties that are retained after surface washing.

All ranges disclosed herein are inclusive and combinable.

By the term "halo" or "halogen" is meant, fluorine, chlorine, bromine, and iodine.

By the term "alkyl" is meant straight chain, branched, or cyclic alkyl groups.

By the term "haloalkyl" is meant an alkyl group as described previously comprising one or more halogen atoms substituting available hydrogen atoms up to perhalogenated substitution.

By the term "about" in combination with a number quantity is meant that the amount can differ depending on a particular embodiment and that it may be necessary for the person skilled in the art to do some limited experimentation to find the optimum amount.

The thermoplastic polymer is preferably polycarbonate, including aromatic polycarbonate, a polyester, a (co)polyester carbonate, copolymers of aromatic polycarbonates, or blends thereof including blends with other thermoplastics resins.

Polycarbonate includes compositions having structural units of the formula (I):

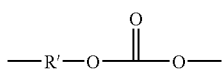

(I)

in which greater than or equal to about 60 percent of the total number of R' groups are aromatic organic radicals and the balance thereof are aliphatic or alicyclic radicals. Preferably, R' is an aromatic organic radical and, more preferably, a radical of the formula (II):

$-A^1-Y^1-A^2-$ (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. The bridging radical $Y^1$ can be a hydrocarbon group or a saturated hydrocarbon group such as methylene, cyclohexylidene or isopropylidene. In another embodiment, zero atoms separate $A^1$ from $A^2$, instead a covalent bond links $A^1$ to $A^2$.

Polycarbonates, in general, can be manufactured by known processes, including interfacial reaction and melt polymerization. For example, polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

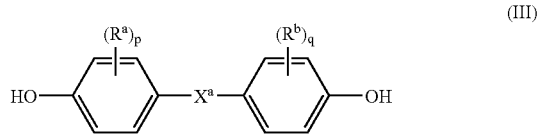

(III)

wherein $R^a$ and $R^b$ each independently represent hydrogen, a halogen atom, preferably bromine, or a monovalent hydrocarbon group; p and q are each independently integers from 0 to 4; and $X^2$ represents one of the groups of formula (IV):

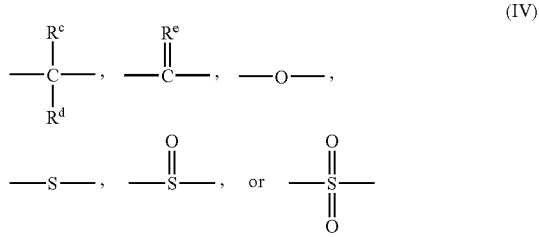

(IV)

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (III) include the bis(hydroxyaryl) alkane series such as, 1,1-bis(4-hydroxyphenyl)methane; 1,1-bis(4-hydroxyphenyl)ethane, 2,2-bis(4-hydroxyphenyl) propane (or bisphenol A); 2,2-bis(3,5-dibromo-4-hydroxyphenyl)propane; 2,2-bis(3,5-dimethyl-4-hydroxyphenyl) propane; 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl) phenylmethane; 2,2-bis(4-hydroxy-1-methylphenyl)propane; 1,1bis(4-hydroxy-t-butylphenyl)propane; 2,2-bis(4-hydroxy-3-bromophenyl)propane; 1,1-bis(4-hydroxyphenyl)decane; 4,4-dihydroxydiphenyl ether; 4,4-thiodiphenol; 4,4-dihydroxy-3,3-dichlorodiphenyl ether; 4,4-dihydroxy-2,5-dihydroxydiphenyl ether; or the like; bis (hydroxyaryl)cycloalkane series such as, 1,1-bis(4-hydroxyphenyl)cyclopentane; 1,1-bis(4-hydroxyphenyl)cyclohexane; 1,1-bis(3,5-dimethyl-4-hydroxyphenyl)cyclohexane; 1,1-bis(4-hydroxyphenyl)cyclododecane; 1,1-bis(3,5-dimethyl-4-hydroxyphenyl)cyclododecane; 1,1-bis-(4-hydroxyphenyl)-3,3,5-trimethylcyclohexane; or the like, or combinations comprising at least one of the foregoing bisphenol compounds.

Other examples of bisphenol compounds that may be represented by formula (III) include those where $X^a$ is —O—, —S—, —S(O)—, or —S(O)$_2$—, such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other dihydroxy compounds that may be utilized in the polycondensation of polycarbonate are represented by the formula (V):

(V)

wherein, $R^f$, is a halogen atom, a hydrocarbon group having 1 to 10 carbon atoms, or a halogen substituted hydrocarbon group; n is a value from 0 to 4. The halogen is preferably bromine. When n is at least 2, $R^f$ may be the same or different. Examples of compounds that may be represented by the formula (V), are resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones, such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing compounds.

Bisphenol compounds such as 2,2,2',2'-tetrahydro-3,3,3', 3'-tetramethyl-1,1'-spirobi-[1H-indene]-6,6'-diol represented by the following formula (VI) may also be used as the dihydroxy compound:

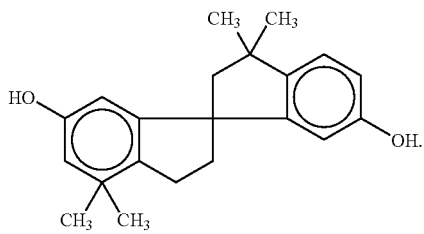

(VI)

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

Branched polycarbonate, as well as blends of linear polycarbonate and a branched polycarbonate may also be used. The branched polycarbonate may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate. Branching agents and procedures for making branched polycarbonates are described in U.S. Pat. Nos. 3,635,895 and 4,001,184.

All types of polycarbonate end groups are contemplated as being useful in the polycarbonate composition. Some examples of common polycarbonate end groups are phenol, p-cumylphenol (PCP) and t-butylphenol.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, diphenyl carbonate, diethyl carbonate, dimethyl carbonate, dibutyl carbonate, dicyclohexyl carbonate, bis(o-methoxyphenyl) carbonate (bismethylsalicilate carbonate, BMSC), or the like, or combinations comprising at least one of the foregoing carbonic acid diesters. The preferred carbonic acid diester is diphenyl carbonate or BMSC.

Also suitable are (co)polyester carbonates, also known as (co)polyester-polycarbonates or polyestercarbonates, that is, resins which contain, in addition to recurring polycarbonate chain units of the formula (VII):

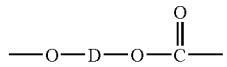

(VII)

wherein D is a divalent radical of a dihydroxy compound employed in the polymerization reaction, the dihydroxy-compound as described previously; repeating or recurring carboxylate units, for example of the formula (VIII):

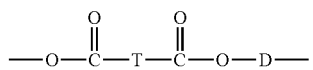

(VIII)

wherein D is as defined above and T is an aromatic radical such as phenylene, naphthylene, biphenylene, substituted phenylene and the like; a divalent aliphatic-aromatic hydrocarbon radical such as an alkaryl or alkaryl radical; or two or more aromatic groups connected through such aromatic linkages which are known in the art.

The copolyester-polycarbonate resins are also prepared by interfacial polymerization technique, well known to those skilled in the art (see, for example, U.S. Pat. Nos. 3,169,121 and 4,487,896).

Examples of dicarboxylic acids include isophthalic acid, terephthalic acid and α, ω aliphatic di-acids with 6–18 carbon atoms. Preferred (co)polyestercarbonates are those of isophthalic, terephthalic acid and resorcinol with or without BPA. In general, any dicarboxylic acid used in the preparation of linear polyesters may be utilized in the preparation of the polyestercarbonate resins. Generally, the dicarboxylic acids which may be utilized includes aliphatic dicarboxylic acids, aromatic dicarboxylic acids, and aliphatic aromatic dicarboxylic acids. These acids are well known and are disclosed, for example, in U.S. Pat. No. 3,169,121. Mixtures of dicarboxylic acids may be employed. Preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of the acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

Blends of PC with other compatible polymers may also be used in the present compositions. Examples of such polymers include polybutylene terephtalate, butadiene styrene rubbers like MBS rubber. The ratio of the other compatible polymers to PC may be up to 50:50, or greater.

Suitable anti-static agents include sulfonic acid salts, for example, those represented by the following formula:

(IX)

wherein Q indicates nitrogen or phosphorus, phosphorus is preferrred; $R^1$ indicates $C_1$–$C_{40}$ alkyl, $C_1$–$C_{40}$ haloalkyl, $C_6$–$C_{40}$ aryl, ($C_6$–$C_{12}$ aryl)$C_1$–$C_{40}$ alkyl, or ($C_1$–$C_{40}$ alkyl)$C_6$–$C_{12}$ aryl; and $R^2$, $R^3$, $R^4$ and $R^5$ each independently indicate a group selected from hydrogen atoms, $C_1$–$C_{20}$ alkyl, $C_6$–$C_{12}$ aryl, ($C_6$–$C_{12}$ aryl)$C_1$–$C_{20}$ alkyl, or ($C_1$–$C_{20}$ alkyl)$C_6$–$C_{12}$ aryl. Here, the term alkyl group includes linear, branched, and cyclic alkyl groups. Furthermore, such alkyl groups and aryl groups may be substituted by optional groups as described in U.S. Pat. No. 6,090,907 to Saito et al.

Examples of alkyl groups which may occur as $R^1$ include, for example, dodecyl groups, decyl groups, butyl groups and ethyl groups, and the like. Examples of aryl, (alkyl)aryl, or (aryl)alkyl groups include dodecylphenyl groups, phenyl groups, benzyl groups, phenethyl groups, tolyl groups and xylyl groups, and the like. $R^1$ is preferably an aryl group.

Examples of alkyl groups which may occur as $R^2$ through $R^5$ independently include $C_1$–$C_{20}$ alkyl groups, for example, methyl, ethyl, propyl and butyl groups, and the like. Examples of aryl groups include phenyl groups, benzyl groups, phenethyl groups, tolyl groups and xylyl groups, and the like.

Examples of desirable sulfonic acid phosphonium salts include tetraalkylphosphonium salts of dodecylsulfonic acid, tetraalkylphosphonium salts of dodecylbenzenesulfonic acid, combinations of the foregoing, and the like.

Substituted phosphonium salts of the medium and short chain sulfonic acids as disclosed in U.S. Pat. No. 6,194,497 to Willems are further examples of suitable antistatic agents. Also the analogous substituted ammonium salts can be used, although the phosphonium salts are preferred. These substituted ammonium and phosphonium salts have the general formula:

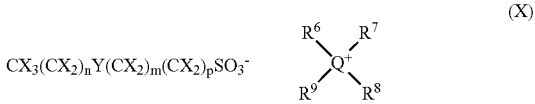

(X)

wherein Q is nitrogen or phosporus, X is independently selected from halogen or hydrogen provided that at least one (1) X is halogen; n, m and p are integers from 0 to 12; and Y is a single bond or nitrogen, oxygen, sulfur, selenium, phosphorus, or arsenic; $R^6$, $R^7$, and $R^8$ are each independently $C_1$–$C_8$ alkyl or $C_6$–$C_{12}$ aryl, and $R^9$ is $C^1$–$C^{18}$ alkyl. The halogen may be independently selected from bromine, chlorine, fluorine and iodine. Preferably, the halogen is fluorine.

A preferred substituted phosphonium sulfonate is fluorinated phosphonium sulfonate and is composed of a fluorocarbon containing an organic sulfonate anion and an organic phosphonium cation. Examples of such organic sulfonate anions include perfluoro methane sulfonate, perfluoro ethane sulfonate, perfluoro propane sulfonate, perfluoro butane sulfonate, perfluoro hexane sulfonate, perfluoro heptane sulfonate, perfluoro octane sulfonate, and the like. Examples of the aforementioned phosphonium cation include aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium, and the like; and aromatic phosphoniums such as tetraphenyl phosphonium, triphenylmethyl phosphonium, triphenylbenzyl phosphonium, tributylbenzyl phosphonium, and the like.

The antistatic agent may be present in the composition in amounts of about 0.1 to about 5 parts by weight, preferably about 0.5 to about 4 parts by weight, more preferably about 1 to about 3 parts by weight, and still more preferably about 1.5 to about 2 parts by weight of the total composition.

The present composition may also comprise up to about 0.1 parts by weight of a sulfonate alkali metal salt, optionally up to about 0.75 parts by weight, or up to about 0.5 parts by weight. Such a compound acts as a synergist for the antistatic agent.

The sulfonate anion of the sulfonate alkali metal salts which may be used can be exemplified by those sulfonates having a $C_1$–$C_{36}$ alkyl group, by those sulfonates having a $C_2$–$C_{24}$ alkenyl group, phenylsulfonate, which may be substituted by a $C_1$–$C_{18}$ alkyl group, diphenylsulfonate, naphthylsulfonate, which may be substituted by a $C_1$–$C_{18}$ alkylgroup as disclosed in EP 1 000 969A1. The potassium salt is preferred.

As the polysiloxane-polyether component, any organic polysiloxane (co)polyether compatible with the thermoplastic resin to be molded can be used. In general the copolymer can be described as having a siloxane backbone with attached one or more polyether groups. The polysiloxane may be substituted with one or more of hydrogen; $C_1$–$C_6$ alkyl such as methyl, ethyl, propyl, and the like; phenyl; vinyl; and $C_1$–$C_6$ alkoxy substituents. The polysiloxane backbone can be a random or block copolymer containing one or more substitutents including hydrogen; $C_1$–$C_6$ alkyl; phenyl; vinyl; or $C_1$–$C_6$ alkoxy substituents.

Non-limiting examples of suitable polysiloxane-polyether polymers are homopolymers of methyl-substituted siloxane, phenyl-substituted siloxane, random copolymers of methyl and phenyl substituted siloxane, block copolymers of methyl and phenyl substituted siloxane, branched polymers of methyl and phenyl substitued siloxane, star polymers of methyl and phenyl substituted siloxane, and the like. The polyether can be bonded to the ends of the polysiloxane backbone or grafted onto the polysiloxane.

In one embodiment the polysiloxane-polyether has the general formula

(XI)

wherein n is about 3 to about 5000, preferably about 3 to about 100, and more preferably about 3 to about 40; $R^9$, $R^{10}$, $R^{11}$, $R^{12}$, $R^{13}$, $R^{14}$ are each independently hydrogen, $C_1$–$C_{20}$ alkyl, $C_6$–$C_{12}$ aryl, ($C_1$–$C_{20}$ alkyl)$C_6$–$C_{12}$ aryl, ($C_6$–$C_{12}$ aryl)$C_1$–$C_{20}$ alkyl, $C_1$–$C_{20}$ alkoxy, or polyether group wherein at least one of $R^9$, $R^{10}$, $R^{11}$, $R^{12}$, $R^{13}$, or $R^{14}$ is a polyether group. Where n is greater than 1, each $R^{10}$ and $R^{11}$ are independently chosen from hydrogen, $C_1$–$C_{20}$ alkyl, $C_6$–$C_{12}$ aryl, ($C_1$–$C_{20}$ alkyl)$C_6$–$C_{12}$ aryl, ($C_6$–$C_{12}$ aryl)$C_1$–$C_{20}$ alkyl, $C_1$–$C_{20}$ alkoxy, or polyether group. Non limiting examples of $R^9$ to $R^{14}$ are methyl, ethyl, propyl, butyl, phenyl, 2-phenylpropyl, vinyl, methoxy, ethoxy, propoxy, or a polyoxyethylene/polyoxypropylene group. The polyether group can be polyethyleneoxide or polypropyleneoxide or combinations thereof, and may be methyl, t-butyl or hydroxyl terminated.

The polysiloxane-polyether compounds can be block copolymers (i.e. $R^9$ and/or $R^{14}$ are polyethers) or graft copolymers (i.e. any or all of $R^{10}$, $R^{11}$, $R^{12}$, and $R^{13}$ are polyether).

The molecular weight of the polyether may be about 100 to about 10000, preferably about 400 to about 5000, and more preferably about 400 to about 2500 grams/mole (g/mol).

The siloxane backbone can generally be a random or block (co)polymer substituted with methyl, phenyl, 2-phenylpropyl, hydrogen and alkoxy groups.

Preferred are siloxane polymers with a concentration of aromatic groups from about 7 percent by weight to about 80 percent by weight based on the total weight of the siloxane polymer. As will be appreciated by the person skilled in the art, higher levels of aromatic groups will be more compatible with the polymer matrix in terms of refractive index, thereby improving transparency. Preferred examples include block and graft copolymers of polyethers and methylphenylsiloxanes, methyl(2-phenylpropyl)siloxanes and dimethylsiloxanes. For good transparency in polycarbonate compositions, a random copolysiloxane of dimethylsiloxane and methylphenyl siloxane or methyl,2-phenylpropyl siloxane in a 2:1 ratio may be used. On this siloxane polymer polyethylene oxide and/or polypropyleneoxide can be grafted or attached to the ends. In general these compound can be synthesized by reaction of organohydrogenpolysiloxane with allyl oxyalkylene glycol, for example according to the methods disclosed in U.S. Pat. No. 6,133,370 to Gutek, U.S. Pat. No. 5,620,485 to Fey, and U.S. Pat. No. 4,690,688 to Adams et al.

Other suitable polysiloxane-polyethers have the general formula:

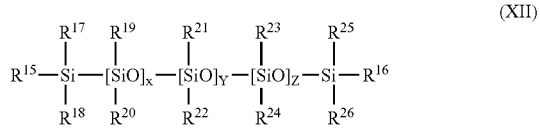

(XII)

wherein x, and z can independently range from 0 to 50; y can range from 1 to 50; $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ are each independently hydrogen, $C_1$–$C_{20}$ alkyl, $C_6$–$C_{12}$ aryl, ($C_1$–$C_{20}$ alkyl)$C_6$–$C_{12}$ aryl, ($C_6$–$C_{12}$ aryl)$C_1$–$C_{20}$ alkyl, $C_1$–$C_{20}$ alkoxy, or polyether group wherein at least one of $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ is a polyether group. In one embodiment, $R^{21}$ and/or $R^{22}$ is a polyether group. In another embodiment, $R^{15}$ to $R^{21}$, $R^{23}$, and $R^{25}$ to $R^{26}$ are methyl. In one embodiment, at least one of $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ is ($C_1$–$C_{20}$ alkyl)$C_6$–$C_{12}$ aryl or ($C_6$–$C_{12}$ aryl)$C_1$–$C_{20}$ alkyl. Preferred polyether groups include polyethylene oxide; polypropylene oxide; combinations of polyethylene oxide and polypropylene oxide; and the like.

The thermoplastic composition according to the invention may also comprise various optional components, including UV absorbing agents, phosphorous type stabilizers as oxidation inhibitors, hindered phenol type oxidation inhibitors, epoxy type stabilizers and sulphur type stabilizers, and the like.

Any ultraviolet absorbing agent customarily used in PC resin compositions may be used as the above mentioned ultraviolet absorbing agent. For example, benzotriazole type ultraviolet absorbing agents, benzophenone type ultraviolet absorbing agents or salicylate type ultraviolet absorbing agents, and the like, may be used. Examples of benzotriazole type ultraviolet absorbing agents include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-amylbutylphenyl)benzotriazole, 2-(2'-hydroxy-3'-dodecyl-5'-methylphenyl)benzotriazole, 2-(2'-hydroxy-3',5'-dicumylphenyl)benzotriazole and 2,2'-methylenebis[4-(1,1,3,3-tetramethylbutyl)-6-(2H-benzotriazol-2-yl)phenol], and the like. For example, a benzotriazole type ultraviolet absorbing agent is marketed by American Cyanamid Co. as UV5411. Furthermore, a benzophenone type ultraviolet absorbing agent is marketed by American Cyanamid Co. as UV531. Examples of salicylate type ultraviolet absorbing agents include phenyl salicylate, p-t-butylphenyl salicylate and p-octylphenyl salicylate, and the like.

Examples of phosphorous type stabilizers comprise triphenyl phosphite, diphenylnonyl phosphite, tris(2,4-di-t-butylphenyl) phosphite, trisnonylphenyl phosphite, diphenylisooctyl phosphite, 2,2'-methylenebis (4,6-di-t-butylphenyl) octyl phosphite, diphenylisodecyl phosphite, diphenylmono (tridecyl) phosphite, 2,2'-ethylidenebis(4,6-di-t-butylphenol) fluorophosphite, phenyldiisodecyl phosphite, phenyldi(tridecyl) phosphite, tris(2-ethylhexyl) phosphite, tris(isodecyl) phosphite, tris(tridecyl) phosphite, dibutyl hydrogenphosphite, trilauryl trithiophosphite, tetrakis(2,4-di-t-butylphenyl)4,4'-biphenylene diphosphite, 4,4'-isopropylidenediphenol alkyl ($C_{12}$–$C_{15}$) phosphites, 4,4'-butylidenebis(3-methyl-6-t-butylphenyl)ditridecyl phosphite, bis (2,4-di-t-butylphenyl) pentaerythritol diphosphite, bis(2,6-di-t-butyl-4-methylphenyl) pentaerythritol diphosphite, bis (nonylphenyl)pentaerythritol diphosphite, distearylpentaerythritol diphosphite, phenyl-bisphenol A pentaerythritol diphosphite, tetraphenyldipropylene glycol diphosphite, 1,1,3-tris(2-methyl-4-di-tridecylphosphite-5-t-butylphenyl)butane and 3,4,5,6-dibenzo-1,2-oxaphosphan-2-oxide, and the like. Available commercial products include Adekastab PEP-36, PEP-24, PEP-4C and PEP-8 (all trademarks, manufactured by Asahi Denka Kogyo K. K.), Irgafos 168 (trademark, manufactured by Ciba Specialty Chemicals.), Sandostab P-EPQ (trademark, manufactured by Clariant), Chelex L (trademark, manufactured by Sakai Kagaku Kogyo K. K.), 3P2S (trademark, manufactured by Ihara Chemical Kogyo K. K.), Mark 329K and Mark P (both trademarks, manufactured by Asahi Denka Kogyo K. K.) and Weston 618 (trademark, manufactured by Sanko Kagaku K. K.).

Examples of hindered phenol type oxidation inhibitors include n-octadecyl-3-(3',5'-di-t-butyl-4-hydroxyphenyl) propionate, 2,6-di-t-butyl-4-hydroxymethylphenol, 2,2'-methylenebis (4-methyl-6-t-butylphenol) and pentaerythritol-tetrakis[3-(3,5-di-t-butyl-4-hydroxyphenyl)propionate, and the like.

Examples of epoxy type stabilizers include epoxidized soybean oil, epoxidized linseed oil, phenylglycidyl ether, allylglycidyl ether and 3,4-epoxycyclohexylmethyl-3',4'-epoxycyclohexane carboxylate, and the like.

Other customary additives may be added to all of the resin compositions at the time of mixing or molding of the resin in amounts as necessary which do not have any deleterious effect on physical properties. For example, coloring agents (pigments or dyes), reinforcing agents (glass fibers, carbon fibers, etc.), fillers (carbon black, silica, titanium oxide, etc.), heat-resistant agents, oxidation inhibitors, weather-proofing agents, lubricants, mold release agents, plasticizer, flame retarding agents and fluidity enhancing agents, and the like, may be added. Furthermore, dyes may be added in order to ameliorate yellowness in the blue direction.

As to the method of preparing the present compositions conventional techniques using standard equipment can be used without any particular limitation, e.g. melt mixing optionally using small amounts of solvents. The components of the composition can be mixed in any order. Extruders, Banbury mixers, rollers and kneaders and the like, operated batchwise or continuously are examples of suitable apparatus.

Compositions of the invention may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions of the invention may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment of the invention relates to articles, sheets and films prepared from the compositions above. Preferred applications of the thermoplastic composition according to the invention are in lenses for automotive head lights or in extruded sheets.

All cited patents, patent applications, and other references are incorporated herein by reference in their entirety. The invention is further illustrated by the following non-limiting examples.

EXAMPLES

The PC used is manufactured by GE Plastics under the trademark LEXAN PC145. Three antistatic additives used in the examples include perfluorobutane sulfonic acid tetrabutyl phosphonium salt $(C_4F_9SO_3^-{}^+P(C_4H_9)_4)$, which was obtained from Dupont under the tradename FC-1; $CF_3SO_3^-{}^+P(C_4H_9)_4$ was synthesized according to the procedure disclosed in U.S. Pat. No. 6,194,497; and $(C_4H_9)_4N^+$ $-N(SO_2CF_3)_2$, was obtained from 3M under the name L-18364.

The details of the polysiloxane-polyether copolymers are tabulated in Table 1. Polysiloxane-polyether copolymers SF1188A and SF1288 were obtained from General Electric Silicones. For comparison, a poly(phenylmethyl-dimethylsiloxane), TSF 437, manufactured by Toshiba Silicones and a poly(dimethylsiloxane), SF96-5 obtained from General Electric Silicones both without polyether functionality, are included.

TABLE 1

Details of the poly(dimethylsiloxane)-polyether copolymers used in the examples

| | $R_1$ | $R_2$ | Polyether composition, MW | $T_{onset}$, °C. | x:y |
|---|---|---|---|---|---|
| SF1188A | Me | EO/PO | 50% EO, 1700 g/mole | 228 | 20:3 |
| SF1288 | Me | EO | 100% EO, 550 g/mole | 196 | 15:5 |
| SF96-5 | Me | — | — | 132 | 8:0 |

TABLE 1-continued

Details of the poly(dimethylsiloxane)-polyether copolymers used in the examples $$R_1-\underset{\underset{Me}{|}}{\overset{\overset{Me}{|}}{Si}}-O-\left[\underset{\underset{Me}{|}}{\overset{\overset{Me}{|}}{Si}}-O\right]_x\left[\underset{\underset{R_2}{|}}{\overset{\overset{Me}{|}}{Si}}-O\right]_y\underset{\underset{Me}{|}}{\overset{\overset{Me}{|}}{Si}}-R_1$$

| | $R_1$ | $R_2$ | Polyether composition, MW | $T_{onset}$, °C. | x:y |
|---|---|---|---|---|---|
| TSF 437 | Me | Ph | — | 164 | * |
| BYK LP G 6234 | EO | — | 100% EO, 1100 g/mole | 361 | * |
| Aldrich 48,257-9 | Me | EO/PO | 50% EO, * | 364 | * |
| TSF 4452 | Me | EO/PO | 50% EO, 1500 g/mole | 228 | 40:4 |
| PEO | — | — | 50% EO, 1700 g/mol | NA | NA |

* Unknown
EO: poly(ethylene oxide);
PO: poly(propylene oxide);
Me: methyl;
Ph: phenyl
PEO is a homopolymer with Mw 1700 g/mol and contains 50% EO units
$T_{onset}$ is the thermal degradation onset temperature measured by Thermal Gravimetric Analysis at 10° C./minute Typical polycarbonate additives, such as mold release agent pentaerythritoltetrastearate (0.3 weight %; tradename PETS G from Faci); heat stabilizer tris(2,4-di-tert-butylphenyl)phosphite (0.036 weight %; tradename Irgafos 168 from Ciba Specialty Chemicals) and oxidation inhibitor of the hindered phenol type octadecyl-3(3',5'-di-tert-butyl-4'-hydroxyphenyl)propionate (0.02 weight %; tradename Irganox 1076 from Ciba Specialty Chemicals) were added to each formulation. Plaques of each formulation were injection molded at 295° C. using injection speeds of 15 and 35 seconds. Plaques used for static decay measurements were wrapped in aluminum foil after molding to protect the surface until measured.

In all the examples, the respective components (expressed in weight percent of the total composition in Table 2) were added to polycarbonate resin. Then pellets were extruded using a twin screw extruder set at 300° C., 300 rpm and 25 kilogram per hour (kg/hr). Pellets thus obtained were injec-tion molded at a molding temperature of 295° C. and a mold temperature of 90° C.

The articles thus obtained were subjected to a static decay test. Static decay half time values were measured on flat-plate injection-molded samples of 70×60×2.55 millimeter (mm) using a Honestometer type S5109 (Shishido Electrostatic Ltd.). The charging potential was −10 kilovolts (kV). Results are represented as the static decay half time value ($t_{1/2}$ in seconds), i.e. the time in which half of the acquired charge is dissipated. After the static decay time is measured for the as-molded samples, the plaques were then washed with running deionized (DI) water for 15 seconds per side and then allowed to dry for one day at 23° C. and 50% relative humidity. Static decay times for the washed samples were measured as described above. A long-term water soak of 6 days was performed on the sample of Example 8 (5 wt % SF1188A and 0.75 wt % FC-1 formulation). Results of the static decay test are provided in Table 2.

TABLE 2

Static decay values for various compositions.

| Example | Polysiloxane-Polyether Copolymer | Salt | Wt % Copolym | Wt % Salt | $t_{1/2}$ (s) as molded | $t_{1/2}$ (s) after washing |
|---|---|---|---|---|---|---|
| Ex. 1 | SF1188A | FC-1 | 2 | 0.75 | 28 | 279 |
| Ex. 2** | SF1188A | FC-1 | 2 | 0.75 | 65 | 292 |
| Ex. 3*** | SF1188A | FC-1 | 2 | 0.75 | 380 | Infinite |
| Ex. 4*** | SF1188A | FC-1 | 5 | 0.75 | 115 | 220 |
| Ex. 5 | SF1188A | FC-1 | 3 | 0.75 | 86 | 96 |
| Ex. 6 | SF1188A | FC-1 | 4 | 0.75 | 37 | 35 |
| Ex. 7 | SF1188A | FC-1 | 5 | 0.75 | 44 | 43 |
| Ex. 8 | SF1188A | FC-1 | 5 | 0.75 | 47 | 43* |
| Ex. 9 | SF1288 | FC-1 | 2 | 0.75 | 29 | 1250 |
| Ex. 10 | BYK 6234 | FC-1 | 2 | 0.75 | 194 | 319 |
| Ex. 11 | SF1188A | $(C_4H_9)_4N^+{}^-N(SO_2CF_3)_2$ | 2 | 0.75 | 131 | 164 |
| Ex. 12 | SF1188A | $CF_3SO_3{}^-{}^+P(C_4H_9)_4$ | 2 | 0.75 | 246 | 346 |
| Ex. 13 | Aldrich 48,257-9 | FC-1 | 2 | 0.75 | 81 | 369 |
| Ex. 14 | TSF 4452 | FC-1 | 2 | 0.75 | 75 | 155 |
| C. Ex. 1 | SF1188A | None | 2 | 0 | Infinite | Infinite |
| C. Ex 2 | none | FC-1 | — | 0.75 | 30 | Infinite |
| C. Ex. 3 | SF96-5 | FC-1 | 2 | 0.75 | Infinite | Infinite |
| C. Ex. 4 | TSF 437 | FC-1 | 2 | 0.75 | 12.7 | Infinite |
| C. Ex. 5 | none | $CF_3SO_3{}^-{}^+P(C_4H_9)_4$ | — | 0.75 | Infinite | Infinite |
| C. Ex. 4 | none | $(C_4H_9)_4N^+{}^-N(SO_2CF_3)_2$ | — | 0.75 | Infinite | Infinite |
| C. Ex 6 | SF96-5/PEO mix 1:1 | FC-1 | 2 | 0.75 | 40 | Infinite |

TABLE 2-continued

Static decay values for various compositions.

| Example | Polysiloxane-Polyether Copolymer | Salt | Wt % Copolym | Wt % Salt | $t_{1/2}$ (s) as molded | $t_{1/2}$ (s) after washing |
|---|---|---|---|---|---|---|
| C. Ex 7 | PEG Mn 1000 | none | 1 | — | Infinite | Infinite |
| C. Ex 8 | PEG Mn 200 | none | 2.5 | — | Infinite | Infinite |
| C. Ex 9 | PEG Mn 1000 | FC-1 | 1 | 0.75 | 2.3 | Infinite |
| C. Ex 10 | PEG Mn 200 | FC-1 | 1 | 0.75 | 40 | Infinite |
| C. Ex 11 | PEG Mn 2000 | FC-1 | 4.1 | 0.75 | Infinite | Infinite |
| C. Ex 12 | TSF 437/PEO mix 1:1 | FC-1 | 2 | 0.75 | 123 | Infinite |
| C. Ex 13 | PEO | FC-1 | 1.5 | 0.75 | 63 | Infinite |
| C. Ex 14 | PEO | FC-1 | 5 | 0.75 | 108 | Infinite |

*after water washing for 6 days
**repeat example
***used PC obtained through melt transesterification The results clearly illustrate that antistatic salts in combination with a polysiloxane-polyether copolymer maintain their antistatic character after water washing. Surprisingly, it has been found that the process for making polycarbonate (melt or interfacial) can affect the optimal amount of polysiloxane-polyether copolymer needed to obtain the desired result (Examples 1, 2, 3 and 4). Example 3 shows that if melt PC is used the effect is only measurable at higher concentrations of polysiloxane-polyether copolymer.

It can also be concluded that a mix of individual polyether and polysiloxane does not show the desired effect, only a copolymer will as illustrated in Examples 1–14 and Comparative Examples 6 and 12 (C. Ex. 6 and 12).

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A thermoplastic composition, comprising:
   about 100 parts by weight of a polycarbonate, an aromatic polycarbonate, a (co)polyestercarbonate, an aromatic (co)polyestercarbonate, or combinations thereof;
   about 0.1 to about 10 parts by weight of an antistatic agent; and
   about 0.1 to about 10 parts by weight of a polysiloxane-polyether copolymer.

2. The composition of claim 1, wherein the antistatic agent is a sulfonic acid salt according to the formula

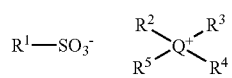

wherein Q is nitrogen or phosphorus; $R^1$ is $C_1$–$C_{40}$ alkyl, $C_1$–$C_{40}$ haloalkyl, $C_6$–$C_{40}$ aryl, ($C_6$–$C_{12}$ aryl)$C_1$–$C_{40}$ alkyl, or ($C_1$–$C_{40}$ alkyl)$C_6$–$C_{12}$ aryl; and $R^2$, $R^3$, $R^4$ and each independently hydrogen, $C_1$–$C_{20}$ alkyl, $C_6$–$C_{12}$ aryl, ($C_6$–$C_{12}$ aryl)$C_1$–$C_{20}$ alkyl, or ($C_1$–$C_{20}$ alkyl)$C_6$–$C_{12}$ aryl.

3. The composition of claim 2, wherein Q is phosphorus and $R^1$ is a $C_1$–$C_{40}$ haloalkyl group wherein the halo is fluoro.

4. The composition of claim 1, wherein the antistatic agent is a sulfonic acid salt according to the formula

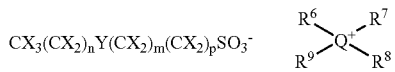

wherein Q is nitrogen or phosporus, X is independently selected from halogen or hydrogen provided that at least one X is halogen; n, m and p are integers from 0 to 12; Y is a single bond or nitrogen, oxygen, sulfur, selenium, phosphorus, or arsenic; $R^6$, $R^7$, and $R^8$ are each independently $C_1$–$C_8$ alkyl or $C_6$–$C_{12}$ aryl; and $R^9$ is $C_1$–$C_{18}$ alkyl.

5. The composition of claim 4, wherein Q is phosphorus.

6. The composition of claim 1, wherein the polysiloxane-polyether copolymer comprises the structure:

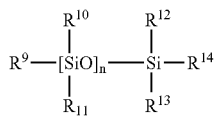

wherein n is about 3 to about 5000; $R^9$, $R^{10}$, $R^{11}$, $R^{12}$, $R^{13}$, $R^{14}$ are each independently hydrogen, $C_1$–$C_{20}$ alkyl, $C_6$–$C_{12}$ aryl, ($C_1$–$C_{20}$ alkyl)$C_6$–$C_{12}$ aryl, ($C_6$–$C_{12}$ aryl)$C_1$–$C_{20}$ alkyl, $C_1$–$C_{20}$ alkoxy, or polyether group, wherein at least one of $R^9$, $R^{10}$, $R^{11}$, $R^{12}$, $R^{13}$, or $R^{14}$ is a polyether group.

7. The composition of claim 6, wherein $R^9$, $R^{14}$, or both are polyethers.

8. The composition of claim 6, wherein $R^{10}$, $R^{11}$, $R^{12}$, $R^{13}$ or a combination of the foregoing are polyethers.

9. The composition of claim 1, wherein the polysiloxane-polyether copolymer is

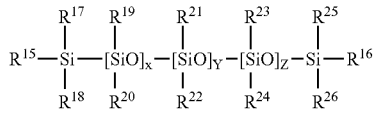

wherein x, and z independently range from 0 to about 50; y is 1 to about 50; $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ are each independently hydrogen, $C_1$–$C_{20}$ alkyl, $C_6$–$C_{12}$ aryl, ($C_1$–$C_{20}$ alkyl)$C_6$–$C_{12}$ aryl, ($C_6$–$C_{12}$ aryl)$C_1C_{20}$alkoxy, or polyether group wherein at least one of $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ is a polyether group.

10. The composition of claim 1, further comprising a sulfonate alkali metal salt.

11. A method for making a permanently antistatic article, comprising:
   melt mixing about 100 parts by weight of a polycarbonate, an aromatic polycarbonate, a (co)polyestercarbonate, an aromatic (co)polyestercarbonate, blends about 0.1 to about 10 parts by weight of an antistatic agent, and about 0.1 to about 10 parts by weight of a polysiloxane-polyether copolymer to form a blend; and
   molding the blend to form an article.

12. A sheet or film of a thermoplastic resin composition, comprising:
   about 100 parts by weight of a polycarbonate, an aromatic polycarbonate, a (co)polyestercarbonate, an aromatic (co)polyestercarbonate, or combinations thereof;
   about 0.1 to about 10 parts by weight of an sulfonic acid salt antistatic agent; and
   about 0.1 to about 10 parts by weight of a polysiloxane-polyether copolymer.

13. An article prepared by the sheet or film of claim 12.

14. An article prepared from the composition of claim 1.

* * * * *